(12) United States Patent
Reinecke

(10) Patent No.: US 10,542,678 B2
(45) Date of Patent: Jan. 28, 2020

(54) AGRICULTURAL HARVESTER CLEANING SYSTEM HAVING EARLY GRAIN EVACUATION

(71) Applicant: CNH Industrial America LLC, New Holland, PA (US)

(72) Inventor: Clay Reinecke, Blue Grass, IA (US)

(73) Assignee: CNH Industrial America LLC, New Holland, PA (US)

(*) Notice: Subject to any disclaimer, the term of this patent is extended or adjusted under 35 U.S.C. 154(b) by 21 days.

(21) Appl. No.: 15/298,038

(22) Filed: Oct. 19, 2016

(65) Prior Publication Data

US 2017/0112065 A1    Apr. 27, 2017

Related U.S. Application Data

(60) Provisional application No. 62/245,559, filed on Oct. 23, 2015.

(51) Int. Cl.
| | | |
|---|---|---|
| *A01F 12/44* | (2006.01) | |
| *A01D 41/06* | (2006.01) | |
| *A01F 7/06* | (2006.01) | |
| *A01F 12/46* | (2006.01) | |

(52) U.S. Cl.
CPC ............ *A01F 12/446* (2013.01); *A01D 41/06* (2013.01); *A01F 7/062* (2013.01); *A01F 12/46* (2013.01)

(58) Field of Classification Search
CPC ........ A01F 12/446; A01F 12/30; A01F 12/44; A01F 12/46; A01F 7/062; A01D 41/06
See application file for complete search history.

(56) References Cited

U.S. PATENT DOCUMENTS

| 4,353,376 A | 10/1982 | Schuler |
| 5,466,190 A * | 11/1995 | Skinner .................. A01F 12/44 460/101 |
| 6,475,082 B2 | 11/2002 | Visagie |
| 2010/0018177 A1* | 1/2010 | Ricketts .................. A01F 11/06 56/103 |
| 2014/0200057 A1 | 7/2014 | Farley et al. |

(Continued)

FOREIGN PATENT DOCUMENTS

| DE | 3503950 A1 | 8/1986 | |
| FR | 2651088 A1 * | 3/1991 | ............... A01F 7/06 |

(Continued)

OTHER PUBLICATIONS

Extended European Search Report for EP Application No. 16195120.7 dated Mar. 23, 2017 (5 pages).

*Primary Examiner* — Robert E Pezzuto
*Assistant Examiner* — Adam J Behrens
(74) *Attorney, Agent, or Firm* — Patrick M. Sheldrake; Peter K. Zacharias

(57) ABSTRACT

An agricultural harvester includes a chassis, a threshing and separating system for separating grain from MOG, and a grain cleaning system for further separating grain from residual MOG. The grain cleaning system has a main grain pan beneath the threshing and separating system with the grain pan having openings in its forward and to selectively receive grain from the forward portion of the threshing and separating system. A component beneath the main grain pan directs flow in parallel to the cleaning system either to a pre-sieve within the cleaning system or to an upper sieve.

16 Claims, 4 Drawing Sheets

(56) References Cited

U.S. PATENT DOCUMENTS

2016/0192591 A1* 7/2016 Missotten ............. A01F 12/444
                                                                460/100
2016/0262311 A1* 9/2016 Bilde .................... A01F 12/446

FOREIGN PATENT DOCUMENTS

| FR | 2651088 A1 | 3/1991 |
| JP | H07250559 A | 10/1995 |
| WO | 93/16581 A1 | 9/1993 |
| WO | 2014/184153 A1 | 11/2014 |
| WO | 2015062965 A1 | 5/2015 |
| WO | 2015/091034 A1 | 6/2015 |

* cited by examiner

AGRICULTURAL HARVESTER CLEANING SYSTEM HAVING EARLY GRAIN EVACUATION

This application claims the benefit of U.S. Provisional Patent Application No. 62/245,559, entitled "Agricultural Harvester Cleaning System Having Early Grain Evacuation" and filed Oct. 23, 2015, the contents of which are incorporated herein by reference.

BACKGROUND OF THE INVENTION

1. Field of the Invention

The present invention relates to agricultural harvesters, and, more particularly, to the grain cleaning system portion following the threshing and separating system of agricultural harvesters.

2. Description of the Related Art

Combines are used to harvest agricultural crops such as corn, soybeans, wheat and other grain crops. As the combine is driven through crop fields, the combine cuts the crop, separates the desired crop from the undesired waste, stores the crop, and discards the waste.

In a typical combine, a header is mounted to the front of the combine to gather the crop and feed the crop into the combine for processing. As the combine is driven through the field, the crop material is collected by the header and deposited into a feeder housing. The crop material is then transported upwardly and into the combine by a feed elevator located within the feeder housing. The crop material then passes through a threshing and separating mechanism. In a rotary combine, the threshing and separating mechanism includes a rotor, a threshing concave, a rotor cage, and a separating grate. As crop material passes between the rotor, the threshing concave and the separating grate, the crop material is impacted and/or rubbed, thereby causing the grain to separate from the stalk material. The stalk material that is separated from the grain is commonly referred to as material other than grain (MOG). Other types of combines are also known that perform similar functions using different mechanisms.

After passing through the threshing and separating assembly, the grain and MOG are deposited onto a grain cleaning system. The grain cleaning system of a typical combine includes a plurality of adjustable cleaning sieves, often referred to as a chaffer sieve and a shoe sieve, and sometimes a pre-cleaning sieve. These sieves are typically reciprocated back and forth in opposite directions along an arcuate path. This motion has the tendency to separate the grain from the MOG. To further separate the grain from the MOG, a cleaning fan or blower is positioned so as to blow air up through the cleaning sieves. This flow of air tends to blow the MOG, which is typically lighter than grain, rearwardly and out the back of the combine. Grain, which is denser than MOG, is allowed to drop through the openings in the sieve.

The clean grain that falls through the cleaning sieves is deposited on a collection panel positioned beneath the cleaning sieves. The collection panel is angled so as to permit the grain to flow, under the influence of gravity, into an auger trough positioned along the lowermost edge of the collection panel. The auger trough is typically positioned near the forward end of the cleaning sieves and extends along the width of the sieves. The grain collected in the auger trough is then moved by an auger towards the side of the combine where it is raised by a grain elevator and deposited into a storage tank or grain tank. Other systems also exist that can utilize, for example, a loop conveyor system which eliminates the need for a conventional cross auger.

One of the issues confronting the systems described above relates to flow capacity of the system within given overall dimensions of the agricultural harvester. The direction of all of the grain and MOG through the axial threshing and separating system tends to increase the load on the cleaning system and make it more difficult to pass grain through ultimately to the grain tank. Complex systems have been proposed to provide multiple sieves and air blasts for ultimately separating the grain from MOG. However, these are generally complicated, add bulk to the overall system volume and are expensive.

Accordingly, what is needed in the art is a system that provides a more efficient extraction of the grain from the harvested crop material.

SUMMARY OF THE INVENTION

The invention, in one form is directed to an agricultural harvester having a chassis, a threshing and separating system for separating grain from MOG, and a grain cleaning system for further separating grain from residual MOG. At least one conveyance apparatus is longitudinally oriented in the chassis and beneath the threshing and separating system for receiving a mixture of grain and MOG from the threshing and separating system and directing it in a rearward direction. A grain cleaning system having at least one sieve further separates grain and MOG and is located beneath and rearward of the at least one conveyance apparatus. The at least one conveyance apparatus has a section adjacent its forward end permitting passage of grain and a component beneath the forward end selectively directs grain towards the grain cleaning system.

An advantage of the present invention is that clean grain from the forward portion of the threshing system may be passed directly to the cleaning system and in some cases to the end most portion of the cleaning system for more efficient extraction of grain without the issue of separating the grain from a higher quantity of MOG.

Another advantage is that the system may have greater capacity for a given size of equipment.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
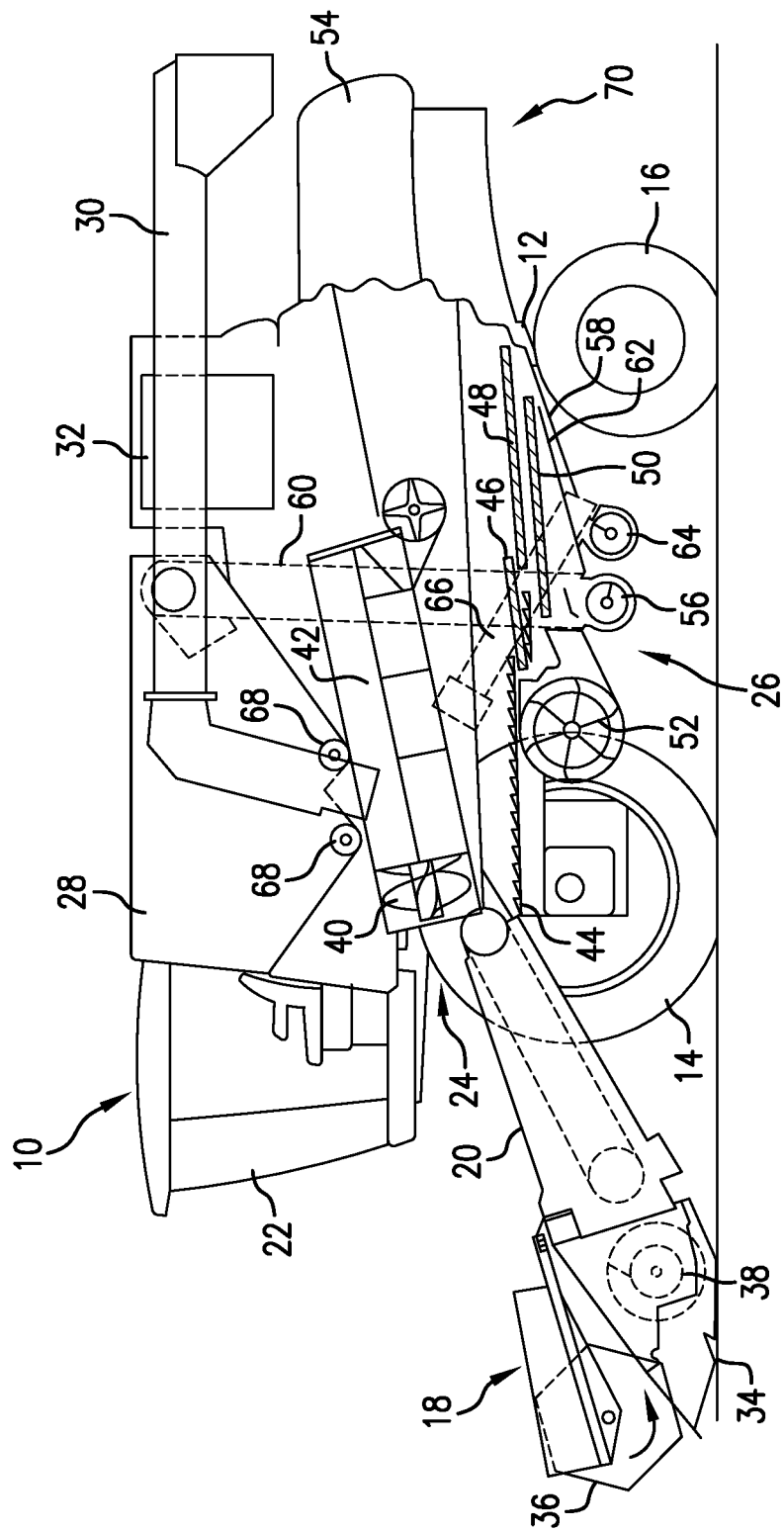
FIG. 1 is a side view of an embodiment of an agricultural harvester according to the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a grain cleaning system 26, a grain tank 28, and an unloading auger 30. It should be appreciated that while the agricultural harvester is shown as combine 10, the agricultural harvester according to the present invention can be any type of construction that allows for crop material to be harvested such as a conventional combine (which does not have a rotor), rotary combine, hybrid combine, chopper harvester, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or halftracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type longitudinally oriented in chassis 12, and generally includes a rotor 40 at least partially enclosed by and rotatable within a corresponding perforated concave 42. The cut crops are threshed and separated by the rotation of rotor 40 and moved in an axially rearward direction within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the rotor 40 and perforated concaves 42 falls onto a main conveyance apparatus 44 and is conveyed toward grain cleaning system 26. Grain cleaning system 26 may include an optional pre-cleaning sieve 46, an upper sieve 48 (also known as a chaffer sieve), a lower sieve 50 (also known as a shoe sieve), and a cleaning fan 52. Grain on sieves 46, 48 and 50 is subjected to a cleaning action by fan 52 which provides airflow through the sieves to remove chaff and other impurities such as dust from the grain by making this material airborne for discharge from straw hood 54 of combine 10. Main conveyance apparatus 44 and pre-cleaning sieve 46 oscillate or reciprocate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50. Conveyance apparatus 44 may be a grain pan, as illustrated, or it may be an auger bed, conveyor belt or other device passing material towards its rearward end.

Clean grain falls to a clean grain auger 56 positioned crosswise below and in front of lower sieve 50. Clean grain auger 56 receives clean grain from each sieve 48, 50 and from bottom pan 58 of grain cleaning system 26. Clean grain auger 56 conveys the clean grain laterally to a generally vertically arranged elevator 60, which can also be referred to as a grain elevator, for transport to grain tank 28. Tailings from grain cleaning system 26 fall to a tailings auger on 62. The tailings are transported via tailings auger 64 and return auger 66 to the upstream end of grain cleaning system 26 for repeated cleaning action. A pair of grain tank augers 68 at the bottom of grain tank 28 convey the clean grain laterally within grain tank 28 to unloading auger 30 for discharge from combine 10. The non-grain crop material proceeds through a residue handling system 70. Residue handling system 70 may include a chopper, counter knives, a windrow door and a residue spreader.

In prior art agricultural harvesters, the sum total of the material passing through the threshing and separating system 24 passes through all of the concaves 42 and the material is carried to the end of the conveyance apparatus 44 for distribution to the cleaning system 26. The difficulty with a system such as this is that there is an ever increasing amount of MOG relative to the grain which must be separated as the material moves toward the rearward concaves 42. In accordance with the present invention, the systems illustrated in FIGS. 2-4 allow grain to be evacuated early and directed in parallel to selected portions of the cleaning system 26.

Figure 2:
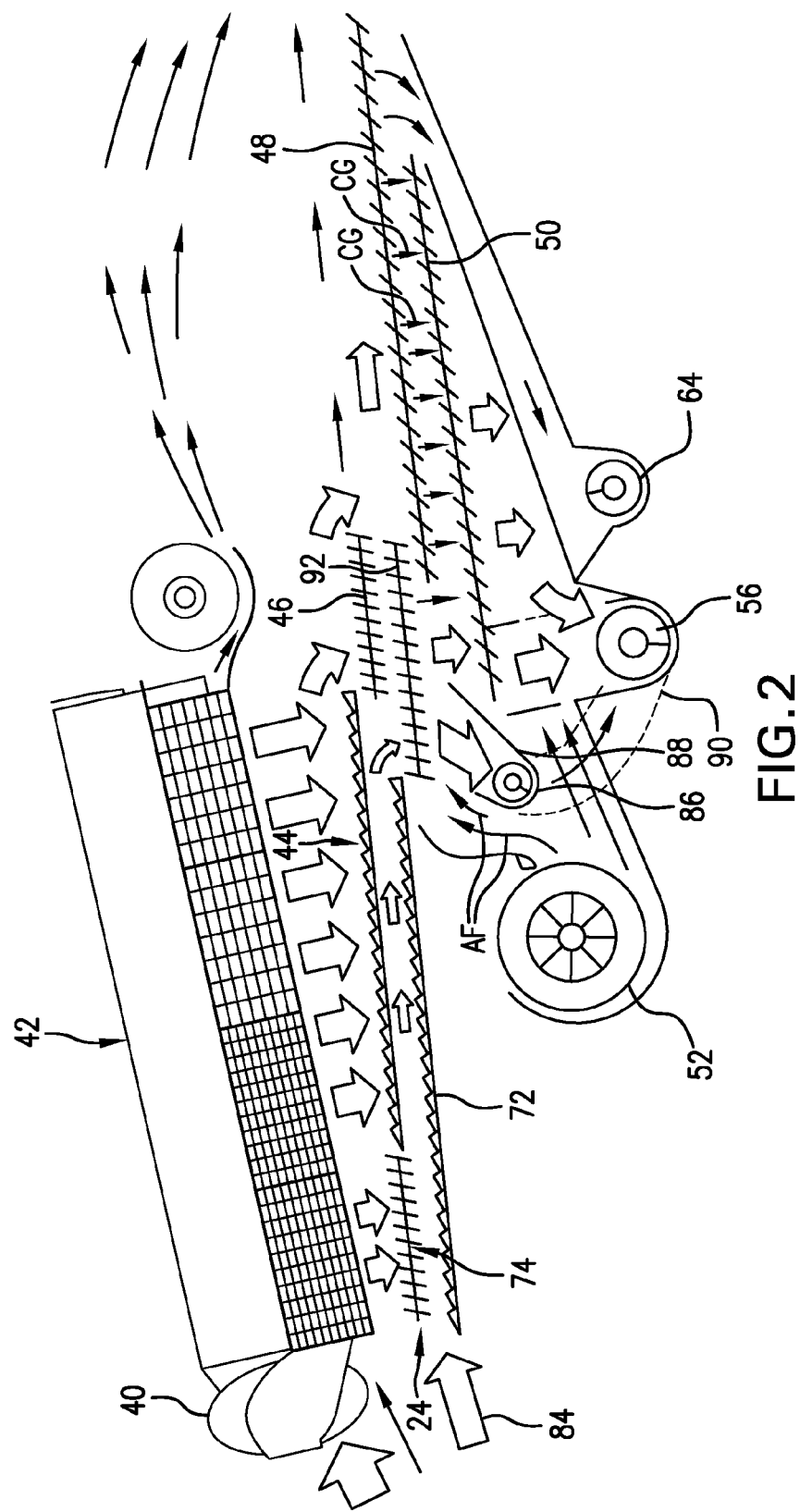
FIG. 2 is a cross-sectional view of a grain cleaning system according to one embodiment of the present invention.

Referring particularly to FIG. 2, the conveyance apparatus 44 has a plurality of openings 74 adjacent its forward end. These openings 74 are sufficiently large to pass grain of the expected size emanating from the perforated concaves in the forward section of the perforated concave. Experience has shown that there is a higher percentage of grain discharged from the concaves 42 at this portion of the rotor relative to the rearward section. The openings may be in the forward half of the conveyance apparatus 44 and preferably in the forward quarter. The grain that has passed through the openings 74 drops by gravity to a device such as a second grain pan 72 that operates like conveyance apparatus 44 in that it reciprocates to move material to its rearward end. It should be noted that grain pan 72 may be in other forms such as the devices listed above in connection with the conveyance apparatus 44.

Second grain pan 72 is elongated like conveyance apparatus 44 and is oriented longitudinally in the chassis 12 for the agricultural harvester 10. At the rearward end of grain pan 72, grain that is passed through openings 74 can pass directly to a second pre-sieve 92 located beneath and somewhat forward of pre-sieve 46, as illustrated. In this way, the grain that has passed through the initial section of the concaves 42 may be directed in parallel to the main flow along the conveyance apparatus 44 to the cleaning system 26 so that it is more efficiently processed. Additionally, the grain directed rearward along grain pan 72 passes across the output of fan 52 to separate grain from lighter MOG. To further separate grain material from lighter MOG as it passes along grain pan 72 a supplemental air source, indicated by arrow 84, may be provided to direct air flow between the lower and upper grain pan 72 and conveyance apparatus 44, respectively to blow lighter MOG into the cleaning system. An auger 86 in a receiving trough 88 may be used to collect the grain thus discharged to carry it to the grain tank 28 through a duct 90 to auger 56. The grain passing between conveyance apparatus 44 and grain pan 72 drops onto a lower pre-sieve 92 and from there onto the front portion of the lower sieve 50. The air from blower 52 is directed past the end of grain pan 72 so that lighter MOG is blown further into the cleaning system.

Figure 3:
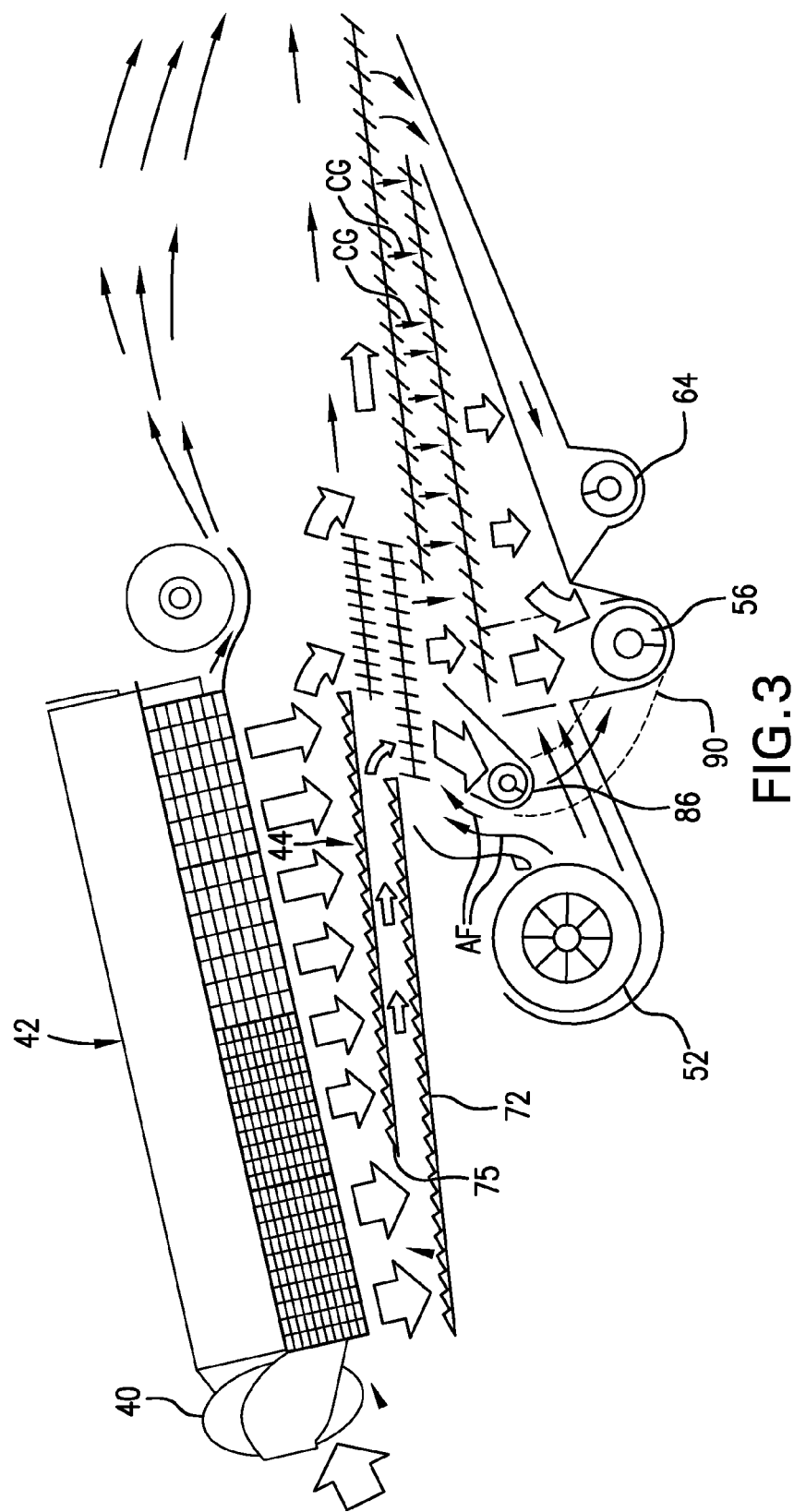
FIG. 3 is a cross-sectional view of a grain cleaning system according to another embodiment of the present invention; and, FIG. 4 is a cross-sectional view of a grain cleaning system according to still another embodiment of the present invention.

The arrangement shown in FIG. 2 has openings in section 74 sufficiently large to accommodate the grain and prevent passage of larger particles. It is also possible, as shown in FIG. 3, to eliminate this section and have the grain drop directly onto grain pan 72 past a forward edge 75 of conveyance apparatus 44. In this case, the grain passing along grain pan 72 follows the same path as in FIG. 3, the difference being that a perforated front section of conveyance apparatus 44 is eliminated.

Figure 4:
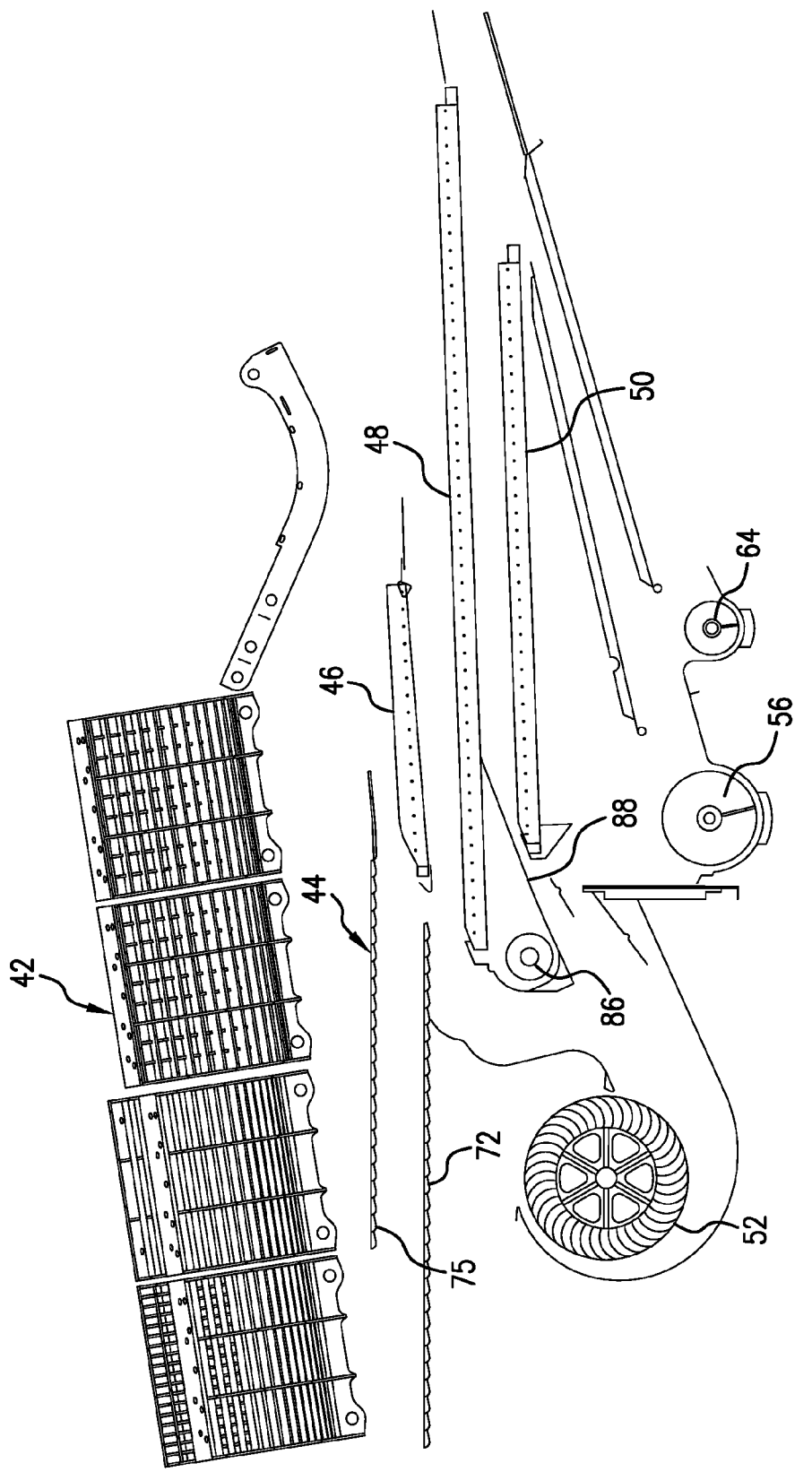

An alternate arrangement is shown in FIG. 4 in which the upper conveyance apparatus 44 is terminated at forward edge 75 as in the embodiment shown in FIG. 3 and the grain pan 72 receives grain only from the front section of the concaves 42. Grain pan 72 bypasses it short of pre-sieve 46 to the front portion of the upper sieve 48 where it is collected in the housing 88 and transferred by auger 86 to auger 56 for delivery to the grain tank.

In all of the embodiments illustrated above the preponderance of grain separated in the first portion of the concaves 42 is selectively and in parallel directed to various portions of the cleaning system 26. In each embodiment, the clean grain is passed to the cleaning system 26 so that the burden on the overall system is eased and the capacity is increased. It is done so with a minimum addition of extra hardware thereby maintaining reliability and economy of construction.

While this invention has been described with respect to at least several embodiments, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester comprising:
    a chassis;
    a threshing and separating system longitudinally oriented in said chassis and having a forward and rearward end for separating grain from material other than grain (MOG) moving in a rearward direction within said threshing and separating system;
    at least one conveyance apparatus longitudinally oriented in said chassis and beneath said threshing and separating system and having a rearward end adjacent the rearward end of said threshing and separating system for receiving a mixture of grain and residual MOG from the threshing and separating system and selectively directing it in a rearward direction;
    a grain cleaning system having at least one sieve for further separating grain and MOG located beneath and rearward of the at least one conveyance apparatus; and
    wherein said conveyance apparatus has a section adjacent its forward end permitting passage of grain and a component beneath said conveyance apparatus and having a component forward end, said component forward end substantially coextensive with the forward end of said threshing and separating system and having a rearward end adjacent the rearward end of said conveyance apparatus for selectively directing grain toward said grain cleaning system.

2. The agricultural harvester as claimed in claim 1, wherein said threshing and separating system has an axial rotor.

3. The agricultural harvester as claimed in claim 1, further comprising a harvesting head for severing and collecting agricultural crop.

4. The agricultural harvester as claimed in claim 3, further comprising a feeder housing receiving harvested crop from said harvesting head and delivering it in a rearward direction to said threshing and separating system.

5. The agricultural harvester as claimed in claim 1, wherein said component comprises a lower grain pan receiving material that has passed the forward section of said at least one conveyance apparatus and delivering it in a rearward direction in parallel to material directed rearward by said at least one conveyance apparatus.

6. The agricultural harvester as claimed in claim 5, wherein said cleaning system has a source blowing air in a rearward direction between the grain pan and the said at least one conveyance apparatus.

7. The agricultural harvester as claimed in claim 5, wherein said cleaning system has a pre-sieve and said at least one conveyance apparatus directs grain onto said pre-sieve and said agricultural harvester further comprises a second pre-sieve onto which said lower grain pan directs grain.

8. The agricultural harvester as claimed in claim 1, wherein said cleaning system has an upper sieve and lower sieve and said component directs grain onto said upper sieve.

9. The agricultural harvester as claimed in claim 8, wherein said cleaning system has a fan directing airflow between said sieves and said component directs grain through said air flow.

10. The agricultural harvester as claimed in claim 9, further comprising a collector of grain beneath said upper sieve.

11. The agricultural harvester as claimed in claim 10, further comprising an auger within the collector beneath said upper sieve for collecting and directing flow of grain.

12. The agricultural harvester as claimed in claim 10, wherein said component directs grain onto the forward portion of said upper sieve.

13. The agricultural harvester as claimed in claim 1, wherein the forward section of said at least one conveyance apparatus is terminated adjacent the forward end of said threshing and separating system to permit passage of grain to said component.

14. The agricultural harvester as claimed in claim 1, wherein the said at least one conveyance apparatus is a grain pan.

15. The agricultural harvester as claimed in claim 1, wherein the section is in said at least one conveyance apparatus and is in the forward half thereof.

16. The agricultural harvester as claimed in claim 15, wherein the section in said at least one conveyance apparatus is in the forward quarter thereof.

\* \* \* \* \*